Figure 1:
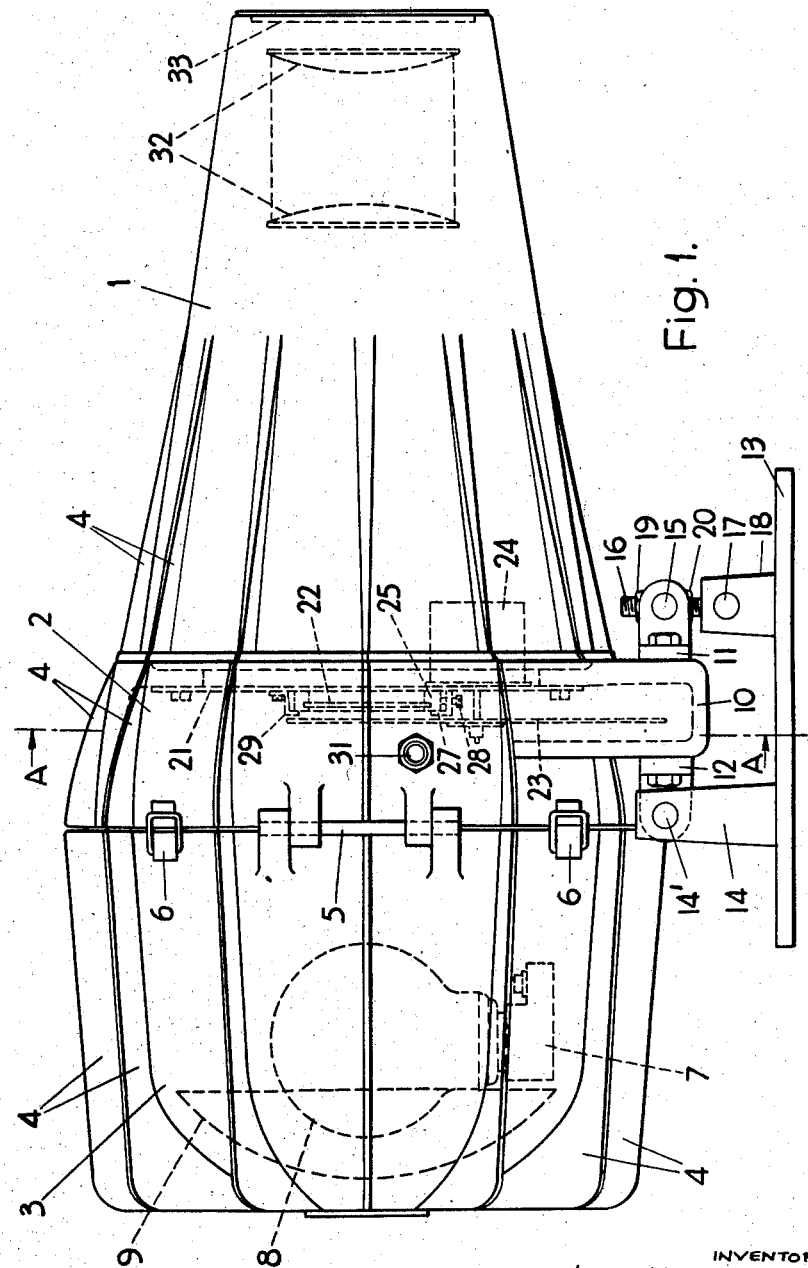

Nov. 17, 1959  H. M. FERGUSON ET AL  2,913,702
ANGLE OF APPROACH INDICATORS FOR AIRCRAFT LANDINGS
Filed May 23, 1956  3 Sheets-Sheet 1

INVENTORS
HAROLD MATTHEW FERGUSON
GARETH MAINWARING

BY
Kirschstein, Kirschstein, Ottinger

ATTORNEYS

2,913,702

ANGLE OF APPROACH INDICATORS FOR AIRCRAFT LANDINGS

Harold Matthew Ferguson, Hatch End, and Gareth Mainwaring, West Drayton, England, assignors to The General Electric Company Limited, London, England Application May 23, 1956, Serial No. 586,760

Claims priority, application Great Britain May 27, 1955

1 Claim. (Cl. 340—26)

This invention relates to angle of approach indicators for guiding aircraft down on to landing strips, said indicator being of the type in which differently colored beams of light are projected at different vertical inclinations to the landing strip so that the pilot of an approaching aircraft can tell, from the color of the beam which he sees, whether his approach is at the correct angle to the strip or at too high or too low an angle respectively.

Usually three beams of light are projected from a single optical projector, using as the objective a filter divided into three differently colored zones, ordinarily red, green and yellow, for providing the three beams of light, the red beam in general being arranged to be at the smallest vertical angle to the landing strip for indicating too low an angle of approach.

For rendering the light beams more readily discernible by the pilot, they are usually arranged to be flashed on and off a number of times each minute, this being effected by moving across the paths of the beams an obturating shutter, for example a disc at least one sector of which is cut away to provide an aperture for the intermittent transmission of the light beams on rotation of the disc. The term "obturating" as used herein denotes substantially impervious to radiant heat and light energy.

The object of this invention is to provide a novel and improved form of approach indicator of the type specified which can readily be designed for use with light sources of high power for producing light beams of very high intensity.

According to the present invention an angle of approach indicator of the type referred to comprises an optical projector including means for mounting a light source so as to irradiate a filter divided into differently colored zones, an optical lens system arranged for projecting an image of said filter in the form of the said differently colored light beams, and an obturating shutter arranged to be moved across the path of the light so that in use of the indicator said light beams are projected only when an aperture in the shutter passes across the light path, said shutter being arranged immediately adjacent to the filter, and preferably between the filter and the light source.

By arranging the obturating shutter immediately adjacent to the filter, it is placed approximately at a focal plane of the lens system, so that a very sharp cut-off of the light beams is obtained in use of the indicator, which enhances the recognizability and clarity of the indication provided to the pilot of an approaching aircraft. Also, by arranging the shutter between the filter and the light source, the filter is intermittently shielded by the shutter, and thus in use of the indicator, is protected from a considerable part of the heat generated by the light source. The latter is usually a tungsten filament lamp, which generates a considerable amount of heat, and the arrangement in accordance with the invention renders it possible to use, without the provision of cooling means for the filter, lamps of higher power than would have been possible if the shutter were placed on the projection lens side of the filter, as usual in known indicators of the type referred to.

Preferably the shutter has the form of an opaque disc arranged to be rotated about its axis and one or more sectors of which are cut away for providing an aperture or apertures permitting the intermittent passage of light to the filter in use of the indicator.

Figure 2:
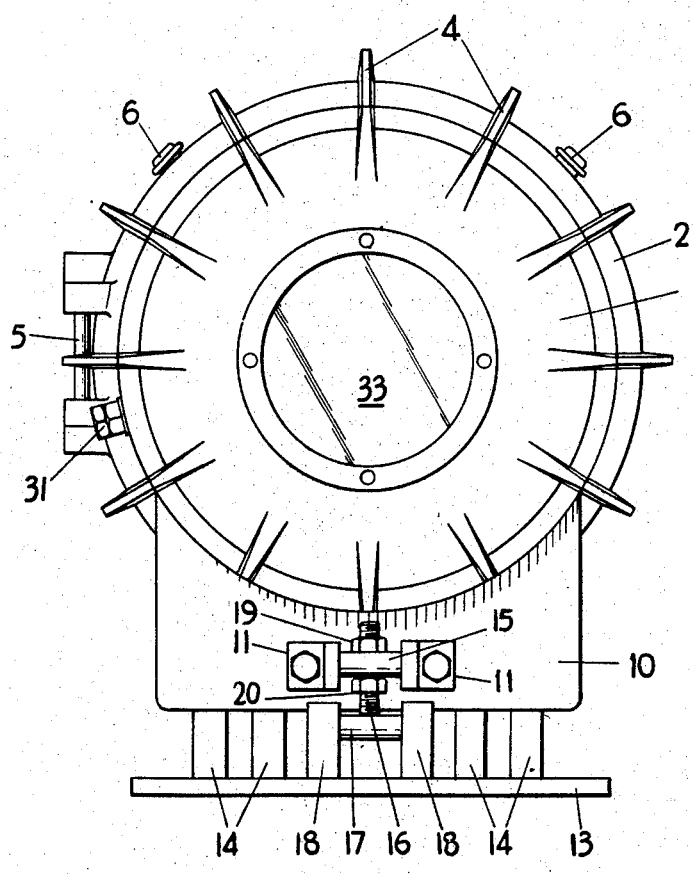
Figure 3:
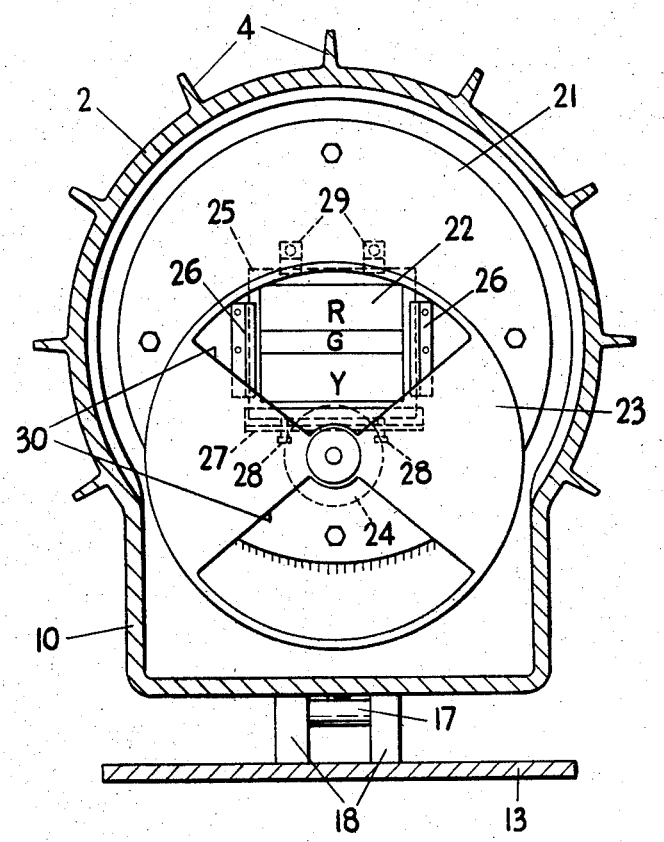

One form of indicator in accordance with the invention will now be described by away of example with reference to the accompanying drawings, in which:

Figure 1 shows a side elevation of the indicator, with the internal arrangement indicated in dotted outline, Figure 2 shows an end elevation looking from the right in Figure 1, and Figure 3 shows the details relevant to the invention in a section along the plane A—A in Figure 1.

The indicator includes an outer casing of die-cast aluminum alloy formed in three sections, namely a forwardly tapering front section 1, containing the projection lenses, a central section 2 rigidly attached to the front section, said central section also having a slight forward taper and containing the filter and shutter mechanism, and a rear sections 3 which has a slight backward taper and is arranged for housing the light source. The casing is formed on its outer surface with cooling fins 4 which extend along the rear and central sections and partly along the front section.

The rear section 3 is hinged to the central section 2 by means of a vertical hinge 5 along one side and is arranged to be fastened to the central section in the closed position by means of four spring clips 6. A gasket (not shown) is provided between the abutting parts of the central and rear sections for ensuring dust-tightness and light-tightness of the joint. Within the rear section is arranged a holder 7 for a filament lamp 8, shown mounted in position, and a backing reflector 9 for the lamp.

The central section 2 is formed with an approximately rectangular extension-trough 10 on its lower side, from the front and rear of which trough extend pairs of brackets, 11 and 12 respectively, for supporting the housing from a base plate 13. The rear pair of brackets 12 is pivoted on a rod 14' extending horizontally between four posts 14 upstanding from the base plate, while the front pair of brackets 11 carries a slotted bar 15 which fits over a substantially vertical threaded rod 16 carried by a horizontal bar 17 pivoted between two posts 18 upstanding from the base plate. On each side of the bar 15 are arranged threaded nuts 19 and 20 which work on the rod 16 and by means of which the bar 15 can be clamped in different positions along the rod, giving different angles of inclination of the axis of the indicator to the base plate.

For the setting up of the apparatus with the required adjustment of the angle of inclination of the indicator to the horizontal, a pointer plate carrying a spirit level and a pointer is pivoted at the end opposite the pointer to a scale plate rigidly attached to the side of the trough 10, the pointer plate being arranged to move vertically over the scale plate with the pointer co-operating with a substantially vertical scale carried by the scale plate. The arrangement is set up in manufacture so that with the spirit level indicating the horizontal, the optical axis of the indicator is horizontal and the pointer coincident with the zero mark on the scale. Then in use, by rotating the pointer plate to shift the pointer downwards along the scale, clamping the pointer plate in the rotated position on the scale plate, and adjusting the indicator until the spirit level registers horizontal once more, the indicator can be set with its optical axis at the elevation indicated by the scale. For the sake of not obscuring other details, this elevation adjusting arrangement has not been included in the drawing.

The front end of the central section 2 is formed with an inwardly directed flange to which is bolted a bulkhead plate 21 which carries the filter 22, the shutter 23 and the electric motor 24 for operating the shutter.

Referring now particularly to Figure 3, the filter 22 is supported in a frame 25 which fits into side brackets 26 and a bottom bracket 27 around an aperture in the plate 21, the bottom bracket being provided with screws 28 for accurately adjusting the position of the filter relative to the axis of the optical system. The filter is formed with transverse red, green and yellow zones indicated respectively by the letters R, G, and Y, the zones being dimensioned vertically to give the required spread of the differently colored beams in the vertical direction. The filter is clamped in the adjusted position by brackets 29 fitting over the top edge of the frame 25 and screwed to the plate 21.

The shutter 23 consists of an opaque circular disc having two diametrically opposite apertures 30 each in the form of a sector of the disc and each extending over an angle somewhat greater than 90°. The disc is mounted so as to lie between the lamp 8 and the filter and is arranged to be driven at the required speed by the electric motor 24 mounted on the opposite side of the plate 21.

The electrical connections for the lamp 8 and motor 24 have been omitted from the drawing for simplicity, but are arranged to pass to the exterior of the casing through a bushing 31 in the central section 2.

The projection lenses for the indicator consist of two large plano-convex lenses 32 mounted at the front end of the front section 1, which is closed at this end, for ensuring dust-tightness, by a glass plate 33.

In one particular example of the indicator described, the lamp 8 was a 2 kilowatt filament lamp, the filter 22 was about 3 inches square, and the lenses 32 were of 6 inches diameter, the distance between the back lens and the reflector 9 being about 27 inches. The shutter 23 was arranged to rotate at a speed of about 25 revolutions per minute, giving a flashing frequency for the light beams of about 50 times per minute, although of course this frequency can readily be aranged to be at whatever figure is required by suitably arranging the speed of the motor.

The internal diameter of the casing at its widest circular section part, i.e. between 3 and 2, was about 18 inches and no forced cooling of the casing or of any of the internal components, including the filter, was found to be necessary in use of the indicator in the open air.

If necessary, however, forced cooling can be applied or ventilation slots arranged in the casing, and in some cases it might be desirable especially to apply forced cooling to the filter to avoid it being damaged by the heat from the lamp.

We claim:

An angle of approach indicator for projecting a flashing pattern of differently colored light beams for guiding aircraft down on to a landing strip, which indicator comprises an optical projector including means for stationarily mounting an electric lamp, a filter divided into differently colored transverse zones arranged vertically above one another and mounted for irradiation by the light from the lamp, an optical lens system arranged for projecting an image of said filter in the form of said inclined differently colored light beams arranged vertically above one another, an obturating disc shutter arranged across the light path, said shutter including openings and opaque portions arranged in sequence, each opening being large enough to pass a beam of sufficient size to substantially completely illuminate the filter and each opaque portion being large enough to substantially block illumination of the filter, means mounting said shutter for unrestricted spinning movement and means for spinning the shutter disc continuously at a uniform speed so that in use of the indicator said light beams are projected only when the aperture in the shutter passes across the light path, said shutter being mounted immediately adjacent to the filter and between the filter and the lamp mounting means so as to screen the filter from the heat of the lamp during the intervals between successive flashes of the light beams and so as to be disposed approximately at a focal plane of the lens system, and means for inclining the projector so that the beam projected thereby can be located at a selectively variable angle to the horizontal.

References Cited in the file of this patent

UNITED STATES PATENTS

| | | |
|---|---|---|
| 1,874,214 | Werner | Aug. 30, 1932 |
| 1,876,511 | Oberg et al. | Sept. 6, 1932 |
| 1,938,002 | Amen | Dec. 5, 1933 |
| 2,023,708 | Spring | Dec. 10, 1935 |
| 2,197,637 | Goldberg | Apr. 16, 1940 |
| 2,278,916 | Critoph et al. | Apr. 7, 1942 |
| 2,441,877 | Flett | May 18, 1948 |
| 2,559,415 | Field | July 3, 1951 |
| 2,597,321 | Hergenrother | May 20, 1952 |